United States Patent
Granados et al.

(10) Patent No.: US 11,344,842 B2
(45) Date of Patent: May 31, 2022

(54) APPARATUS AND METHOD FOR SEPARATING $CO_2$ AT LOW TEMPERATURE COMPRISING A STEP OF SEPARATION BY PERMEATION

(71) Applicant: L'Air Liquide, Societe Anonyme pour l'Etude et l'Exploitation des Procedes Georges Claude, Paris (FR)

(72) Inventors: Ludovic Granados, Puteaux (FR); Mathieu Leclerc, Paris (FR); Frederick Lockwood, Paris (FR); Paul Terrien, Newton, MA (US)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 552 days.

(21) Appl. No.: 16/309,737

(22) PCT Filed: Jun. 12, 2017

(86) PCT No.: PCT/FR2017/051488
§ 371 (c)(1),
(2) Date: Dec. 13, 2018

(87) PCT Pub. No.: WO2017/216456
PCT Pub. Date: Dec. 21, 2017

(65) Prior Publication Data
US 2019/0118134 A1    Apr. 25, 2019

(30) Foreign Application Priority Data

Jun. 16, 2016   (FR) ................................. FR 1655601

(51) Int. Cl.
*B01D 53/22*   (2006.01)
*B01D 53/00*   (2006.01)
(Continued)

(52) U.S. Cl.
CPC ......... *B01D 53/229* (2013.01); *B01D 53/002* (2013.01); *B01D 53/261* (2013.01);
(Continued)

(58) Field of Classification Search
CPC .............. B01D 53/261; B01D 2313/38; B01D 2311/04; B01D 2311/10; B01D 53/002;
(Continued)

(56) References Cited

U.S. PATENT DOCUMENTS 3,126,265 A  *  3/1964  Yendall ...................... F25J 5/00
                                                              62/641
5,562,754 A  *  10/1996  Kang .................. C01B 13/0251
                                                              95/54
(Continued)

FOREIGN PATENT DOCUMENTS

EP       1 952 874       8/2008
EP       2 404 656       1/2012
(Continued)

OTHER PUBLICATIONS

International Search Report and Written Opinion for PCT/FR2017/051488, dated Oct. 6, 2017.

*Primary Examiner* — Anthony R Shumate
(74) *Attorney, Agent, or Firm* — Justin K. Murray

(57) ABSTRACT

In a method for separating a mixture containing carbon dioxide, the mixture is cooled in a heat exchanger and partially condensed and a first liquid is separated from the mixture in a first system operating at low temperature comprising at least one first phase separator and a gas from the first system is treated in a membrane system to produce a permeate and a non-permeate, the gas from the first system being divided into two portions, a first portion being sent to the membrane system without being heated and a second portion being heated to at least an intermediate temperature (Continued)

of the heat exchanger and then sent to the membrane system without being cooled.

13 Claims, 3 Drawing Sheets

(51) Int. Cl.
*C01B 32/50* (2017.01)
*F25J 3/02* (2006.01)
*B01D 53/26* (2006.01)
*F25J 3/06* (2006.01)

(52) U.S. Cl.
CPC .............. *C01B 32/50* (2017.08); *F25J 3/0223* (2013.01); *F25J 3/0252* (2013.01); *F25J 3/0266* (2013.01); *F25J 3/067* (2013.01); *B01D 2256/22* (2013.01); *B01D 2311/04* (2013.01); *B01D 2311/10* (2013.01); *B01D 2313/38* (2013.01); *F25J 2200/02* (2013.01); *F25J 2205/02* (2013.01); *F25J 2205/40* (2013.01); *F25J 2205/66* (2013.01); *F25J 2205/80* (2013.01); *F25J 2210/04* (2013.01); *F25J 2210/70* (2013.01); *F25J 2220/82* (2013.01); *F25J 2230/30* (2013.01); *F25J 2230/32* (2013.01); *F25J 2230/80* (2013.01); *F25J 2235/80* (2013.01); *F25J 2240/02* (2013.01); *F25J 2240/40* (2013.01); *F25J 2245/02* (2013.01); *F25J 2270/02* (2013.01); *F25J 2270/04* (2013.01); *Y02P 20/151* (2015.11)

(58) Field of Classification Search
CPC ................ B01D 53/229; B01D 2256/22; F25J 2210/70; F25J 2200/02; F25J 2240/40; F25J 3/067; F25J 2245/02; F25J 2205/02; F25J 2220/82; F25J 2210/04; F25J 2235/80; F25J 2230/32; F25J 3/0252; F25J 2205/40; F25J 2230/30; F25J 3/0266; F25J 2205/80; F25J 2240/02; F25J 2205/66; F25J 2230/80; F25J 3/0223; F25J 2270/02; F25J 2270/04; Y02P 20/151; C01B 32/50
See application file for complete search history.

(56) References Cited

U.S. PATENT DOCUMENTS

| | | | | |
|---|---|---|---|---|
| 6,164,373 | A * | 12/2000 | Perry | B01D 53/265 165/154 |
| 7,666,251 | B2 * | 2/2010 | Shah | C01B 32/50 95/94 |
| 8,088,196 | B2 * | 1/2012 | White | B01D 63/02 95/51 |
| 9,562,473 | B2 * | 2/2017 | Itoh | F02C 1/08 |
| 10,533,461 | B2 * | 1/2020 | Fetvedt | F01K 13/02 |
| 10,914,232 | B2 * | 2/2021 | Allam | F02C 3/34 |
| 2003/0056529 | A1 * | 3/2003 | Kakehashi | B60H 1/00978 62/186 |
| 2005/0247197 | A1 * | 11/2005 | Snow | A62C 3/06 95/138 |
| 2008/0176174 | A1 * | 7/2008 | White | B01D 53/22 431/5 |
| 2013/0153498 | A1 * | 6/2013 | Kiuchi | B01D 61/368 210/640 |
| 2014/0027367 | A1 * | 1/2014 | Tachibana | B01D 61/362 210/253 |
| 2014/0231058 | A1 * | 8/2014 | Nakamura | F28D 3/02 165/177 |
| 2015/0174523 | A1 * | 6/2015 | Darde | B01D 53/22 95/41 |
| 2015/0211754 | A1 * | 7/2015 | Warmerdam | F24F 6/02 62/271 |
| 2015/0300734 | A1 * | 10/2015 | Davidian | F25J 3/0223 62/624 |
| 2016/0159672 | A1 * | 6/2016 | Yokoi | B01D 61/58 210/636 |
| 2018/0371959 | A1 * | 12/2018 | Ebert | F01K 13/02 |
| 2020/0263603 | A1 * | 8/2020 | Homison | F02C 3/06 |

FOREIGN PATENT DOCUMENTS

| | | |
|---|---|---|
| WO | WO 94 04250 | 3/1994 |
| WO | WO 2014 009 449 | 1/2014 |
| WO | WO 2014 009 643 | 1/2014 |

* cited by examiner

Cryocap Oxy – Process scheme

APPARATUS AND METHOD FOR SEPARATING $CO_2$ AT LOW TEMPERATURE COMPRISING A STEP OF SEPARATION BY PERMEATION

CROSS REFERENCE TO RELATED APPLICATIONS

This application is a § 371 of International PCT Application PCT/FR2017/051488, filed Jun. 12, 2017, which claims the benefit of FR1655601, filed Jun. 16, 2016, both of which are herein incorporated by reference in their entireties.

TECHNICAL FIELD OF THE INVENTION

The present invention relates to an apparatus and to a method for purifying $CO_2$ at low temperature comprising a step of separation by permeation.

It relates in particular to a method for start-up of a membrane that has to be operated at low temperature in an apparatus for purifying $CO_2$ at low temperature.

The present invention relates to the treatment of uncondensed gases from a unit for purifying $CO_2$ at low temperature in membranes operated at low temperatures (<−10° C.).

BACKGROUND OF THE INVENTION

All the percentages relating to purities in this document are molar percentages.

The increase in the concentration of carbon dioxide in the atmosphere is very largely the cause of global warming. $CO_2$ of human origin is essentially emitted into the atmosphere by the combustion of fossil fuels in thermal power stations and in a certain number of industrial units such as cement works, hydrogen production units or steelmaking units.

In the context of reducing emissions of greenhouse gases and/or production of $CO_2$ used for enhanced oil recovery, a unit for capture and purification of $CO_2$ by the cryogenic route may be used downstream of the $CO_2$-emitting installations. $CO_2$ capture and purification by the cryogenic route is based essentially on partial condensation of the $CO_2$ at temperatures near its triple point, which may be supplemented with one or more distillations to increase the $CO_2$ purity of the end product.

For these partial condensations and distillation, it will be necessary to compress the gases to be purified, dry them and then cool them to form a liquid phase enriched in $CO_2$ and a gas phase enriched in noncondensable gases that will be separated in one or more partial condensation traps. With this type of method, capture efficiencies between 80 and 95% are attainable.

Most of the time the noncondensable gases are heated against the gases to be purified, which cool down prior to emission to atmosphere. Before they are emitted into the ambient air, it will also be possible to use them for regenerating the dryers of the capture unit.

In order to maximize the $CO_2$ capture efficiency, membranes may also be used for the noncondensable gases from the partial condensation trap or traps. A method of this type is known from EP-A-2404656.

The permeate from the membranes, then being laden with $CO_2$ and at a lower pressure than the noncondensable gases, may be recycled to the compression chain of the capture unit. The $CO_2$ that will thus have passed through the membrane and that will have been recycled to the compressor could then be liquefied in the partial condensation trap or traps. Capture efficiencies of the order of 99% may be expected by coupling the partial condensation method with the membrane method.

Two important parameters allow the membranes to be dimensioned and their performance quantified: the yield per membrane and the selectivity for $CO_2$. The higher the $CO_2$ yield, the less it will be necessary to add modules of membranes to increase the overall efficiency of the unit. The initial investment is then reduced. The higher the selectivity for $CO_2$, the less the other gases will pass through the membrane. A high selectivity for $CO_2$ makes it possible to obtain a permeate that is purer in $CO_2$ and reduce the energy consumption of the compressor of gases to be purified. In fact, the noncondensable gases that cross the membrane are also recycled to this compressor and will therefore increase the flow to be treated within the latter, thus affecting its energy consumption. In accordance with the same concept, the size of the compressor could be reduced if the selectivity of the membranes is increased.

To optimize both the efficiency and the selectivity of the membranes, it may prove relevant to use them at subambient temperatures, or even (temperatures <−10° C.). A method of this type is described in WO-A-2014/009449, EP1952874 and WO-A-2014/009643. Therefore they will be placed directly downstream of the partial condensation trap or traps with or without expansion of the noncondensable gases.

If the temperature of the trap is too low to ensure proper operation and especially the feasibility of the membranes, the noncondensable gases may be partially heated before they are sent to the membranes, up to temperatures between −45 and −10° C. WO2014/009449 and EP1952874 suggest heating all of the gas that comes from the phase separator upstream of the membrane whereas WO-A-2014/009643 does not heat it.

However, when putting these membranes into operation it is necessary to control the gradual cooling of these membranes: in fact direct feed of cold gas to the membranes could cause high mechanical stresses on this equipment and lead to its degradation.

Moreover, it is necessary to ensure proper control of the operating conditions of these membranes (notably of the temperature) during normal operation to ensure optimal efficiency as well as ensure integrity of the materials of the membranes.

SUMMARY OF THE INVENTION

Certain embodiments of the invention make it possible to purify a gas mixture containing at least 30% of carbon dioxide, or even at least 50% of carbon dioxide, or even at least 75% of carbon dioxide to produce a flow enriched in carbon dioxide relative to the mixture. The percentages mentioned relate to the gas mixture on a dry basis, the latter very often containing water.

According to one aim of the invention, a method is provided for separating a mixture containing carbon dioxide, in which:

i) the mixture is cooled in a heat exchanger and partially condensed and a first liquid is separated from the mixture in a first system operating at low temperature comprising at least one first phase separator and optionally a column for separating the liquid received from the phase separator and ii) a gas from the first system is treated in a membrane system to produce a permeate and a non-permeate, the gas from the first system being divided into two portions, a first portion being sent to the membrane system without being heated in the heat exchanger and a second portion being heated to at least an intermediate temperature of the heat exchanger, preferably up to the hot end of the latter and then sent to the membrane system without being cooled.

According to other optional aims:

the first system produces a fluid enriched in $CO_2$ as the end product, and this product may be a liquid, optionally pressurized the mixture is purified by adsorption in an adsorption unit upstream of the heat exchanger, and during a first phase, which is a starting phase, at least one portion of the gas from the first system is sent to the adsorption unit as a regenerating gas and no portion of the gas from the first system is sent to the membrane system, and during a subsequent phase, which is a phase of stable operation, following the starting phase, at least one portion of the gas from the first system is sent to the membrane system and at least one portion of the permeate or non-permeate from the membrane system is sent to the adsorption unit as a regenerating gas.

during a second phase, which is a starting phase, following the first phase, a portion of the gas from the first system is heated and then sent to the membrane system and at least one portion of the permeate or non-permeate from the membrane system as well as a portion of the gas from the first system are sent to the adsorption unit as a regenerating gas during a first phase, which is a starting phase, at least one portion of the gas from the first system is sent to atmosphere and no portion of the gas from the first system is sent to the membrane system and during a subsequent phase, which is a phase of stable operation, at least one portion of the gas from the first system is sent to the membrane system and at least one portion of the permeate or non-permeate from the membrane system is sent to atmosphere.

in the first phase, at least one portion of the gas from the first system is expanded in a turbine and then sent to atmosphere and in the subsequent phase, at least one portion of the non-permeate is expanded in a turbine and then sent to atmosphere.

in the first phase, a first portion of the gas from the first system is expanded in the turbine and then sent to atmosphere and a second portion of the gas from the first system is expanded in an expanding means other than the turbine and then sent to atmosphere in a second phase, which is a starting phase, following the first phase, a portion of the gas from the first system is heated and then sent to the membrane system and another portion of the gas from the first system is sent to atmosphere, optionally after expansion in a turbine in order to start up the method, according to a first phase a valve sending the gas from the first system directly to the membrane system is closed and all the gas is heated in the heat exchanger an inlet valve of the membrane system is closed the gas heated in the heat exchanger is separated into two portions:

one portion of the heated gas circulates in a first bypass circuit, regulated by a first bypass valve, of the membrane system to a pipe connected to the membrane system and to the adsorption unit via the heat exchanger one portion of the heated gas circulates in a second bypass circuit, regulated by a valve, which sends the rest of the gas to atmosphere optionally on passing through the heat exchanger and/or through the turbine(s).

in the latter case, as the flow is greater than the nominal flow of the turbine(s), a bypass circuit of the turbine(s) is required if the latter have not been dimensioned for treating this additional flow.

the channel in question in the exchanger that leads to the turbine will have to be dimensioned for treating this additional flow.

another option consists of starting up the turbine(s) only after complete start-up of the membranes. The turbine or turbines are completely bypassed via a valve in this case.

According to another aim of the invention, an apparatus is provided for separating a mixture containing carbon dioxide, comprising:

i) A unit for drying by adsorption.
ii) A heat exchanger.
iii) A first separating system able to operate at a temperature below −10° C. comprising at least one first phase separator and optionally a separating column connected for receiving a liquid from the first phase separator.
iv) A pipe for sending a mixture dried in the unit for drying by adsorption to be cooled in the heat exchanger to form a partially condensed flow.
v) A membrane system.
vi) A pipe for bringing out a flow enriched in carbon dioxide from the first separating system.
vii) A pipe for sending a gas from the first system to the membrane system.
viii) A pipe for bringing out a permeate from the membrane system and a pipe for bringing out a non-permeate from the system in which the pipe for sending the gas from the first system to the membrane system is connected to the heat exchanger in order to allow a portion of the gas to be heated to at least an intermediate temperature of the heat exchanger, preferably up to the hot end of the latter, the membrane system being connected to the first system by another pipe allowing another portion of the gas to be sent to the membrane system without being heated in the heat exchanger.

According to other optional aspects, the apparatus comprises:

means for sending at least one portion of the gas from the first system directly to atmosphere, optionally after expansion.

means for sending at least one portion of the gas from the first system to the drying unit as a regenerating gas.

BRIEF DESCRIPTION OF THE DRAWINGS

The present invention will be clearly understood and its advantages will arise from the description which follows, given merely as a non-limitative example, and with reference to the attached drawings in which.

DETAILED DESCRIPTION

The invention will be described referring to FIGS. 2 and 3, which illustrate the method according to the invention in more detail.

Figure 1:
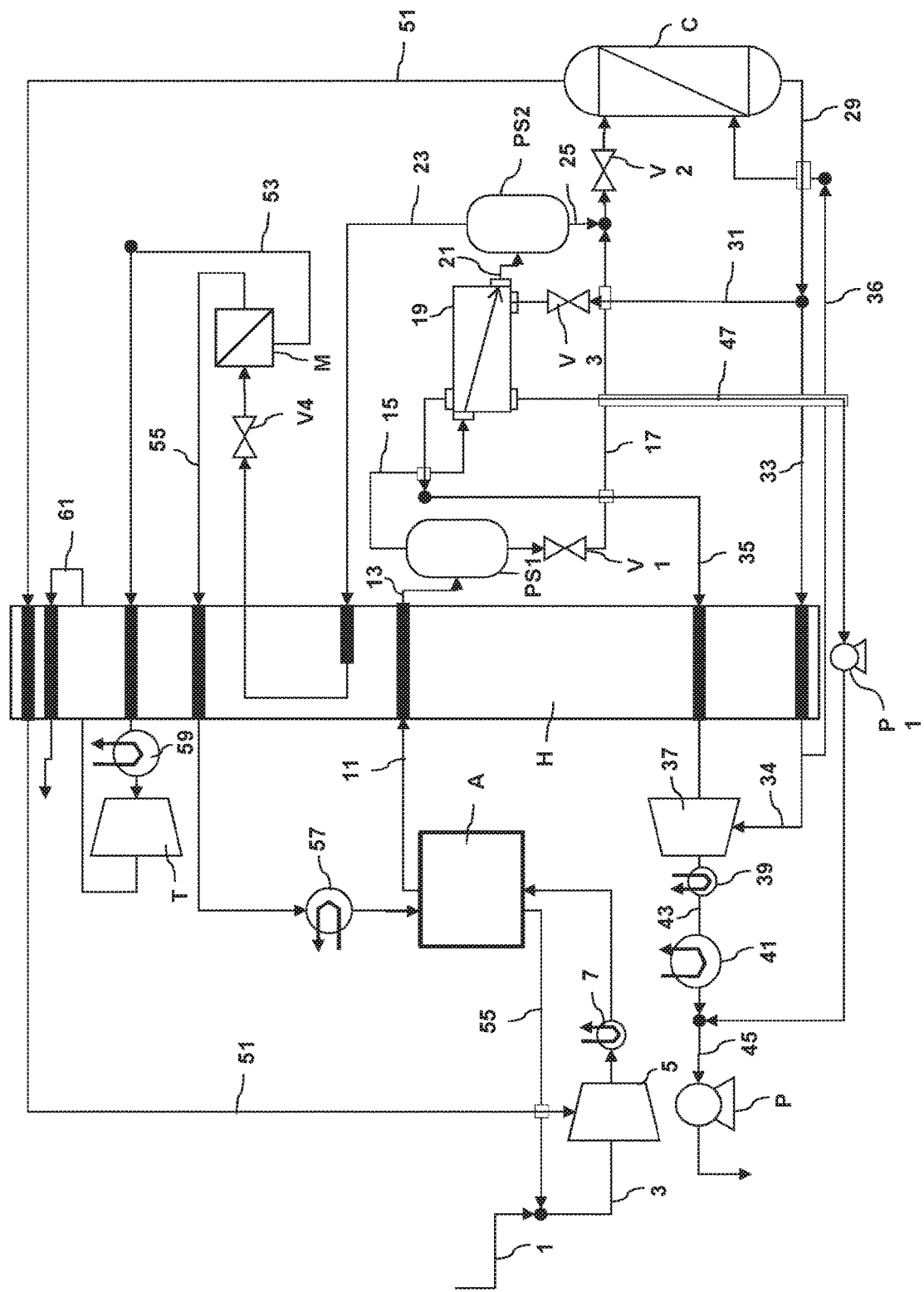
FIG. 1 provides a variant of the process described in WO2014/006463.

In the variant in FIG. 1, the apparatus comprises a single multifluid heat exchanger, called main exchanger H. The method is not covered by the claims and represents a variant of the method of WO2014/009643, with two phase separators and one column, rather than just one phase separator.

A gas mixture 1 containing carbon dioxide, moisture and at least one other gas, selected from the list: hydrogen, nitrogen, oxygen, argon, carbon monoxide, is mixed with a gas 55 and sent as mixture 3 to a compressor 5. After being cooled by the cooler 7, the mixture is purified of water by the adsorption unit A to form the dried flow 11. The dried flow 11 condenses partially in the exchanger H and is sent as flow 13 to the phase separator PS1.

The first system operating at low temperature comprises in this case two phase separators PS1 and PS2, as well as a stripping column C. The gas from the first phase separator PS1 is cooled in a heat exchanger 19 and condenses partially to form flow 21. Flow 21 is sent to the second phase separator PS2. The liquid 17 expanded in valve V1 that comes from separator PS1 and the liquid 25 are mixed, the mixed liquid is expanded in valve V2 and sent to the top of column C.

The overhead gas 51 from the column is heated in the heat exchanger H and is recompressed in the compressor 5 with flow 3. The bottom liquid 29 from column C is split into two. A portion 33 is vaporized in the heat exchanger H and is split into two. A portion 34 is sent to a compressor 37, is cooled by the cooler 39 to form flow 43, is condensed by the cooler 41 and then pumped by pump P to form a liquid product under pressure rich in carbon dioxide.

The remainder 36 of the flow 33, heated up to the hot end of the exchanger, is returned to the bottom of column C, without being cooled.

The flow 31 of bottom liquid is heated in the exchanger 19 after expansion in a valve V3 and is pumped in a pump P1 before being mixed with the flow 43 to form flow 45 to be pressurized in pump P to a predetermined pressure.

The overhead gas 23 from phase separator PS2 is enriched in noncondensable gases, for example hydrogen, carbon monoxide, nitrogen, argon or oxygen.

This gas is heated in the heat exchanger H to an intermediate temperature of the latter. The lines shown in bold in the figure represent flows that are heated or cooled in the exchanger and the ordinary lines represent a pipe for the flow that does not pass through the heat exchanger.

The partially heated gas 23 is expanded in a valve V4 and sent to a membrane system, in this case comprising a membrane M producing a permeate 55 and a non-permeate 53. The non-permeate 53 will be strongly heated before being sent to atmosphere. The non-permeate 53 may be expanded in a turbine T after heating in a heater 59, the expanded flow 61 then being heated in the heat exchanger.

In this way the flow fed to the membrane system M is at a temperature below $-10°$ C.

The drawback of such a configuration resides mainly in the absence of precise temperature control at the inlet of the membranes owing to the intermediate discharge of the exchanger, in particular during transient operating phases (starting, increase or decrease in load or even fluctuation of composition of the fumes being treated).

Moreover, it is necessary to perform a very gradual cold descent of the membranes during hot starting because of problems of mechanical integrity of the materials of the membranes. The scheme with intermediate discharge does not allow this cold descent. In fact, during hot starting the membranes are at ambient temperature and the gas that will be sent to them directly will already be at low temperature.

Figure 2:
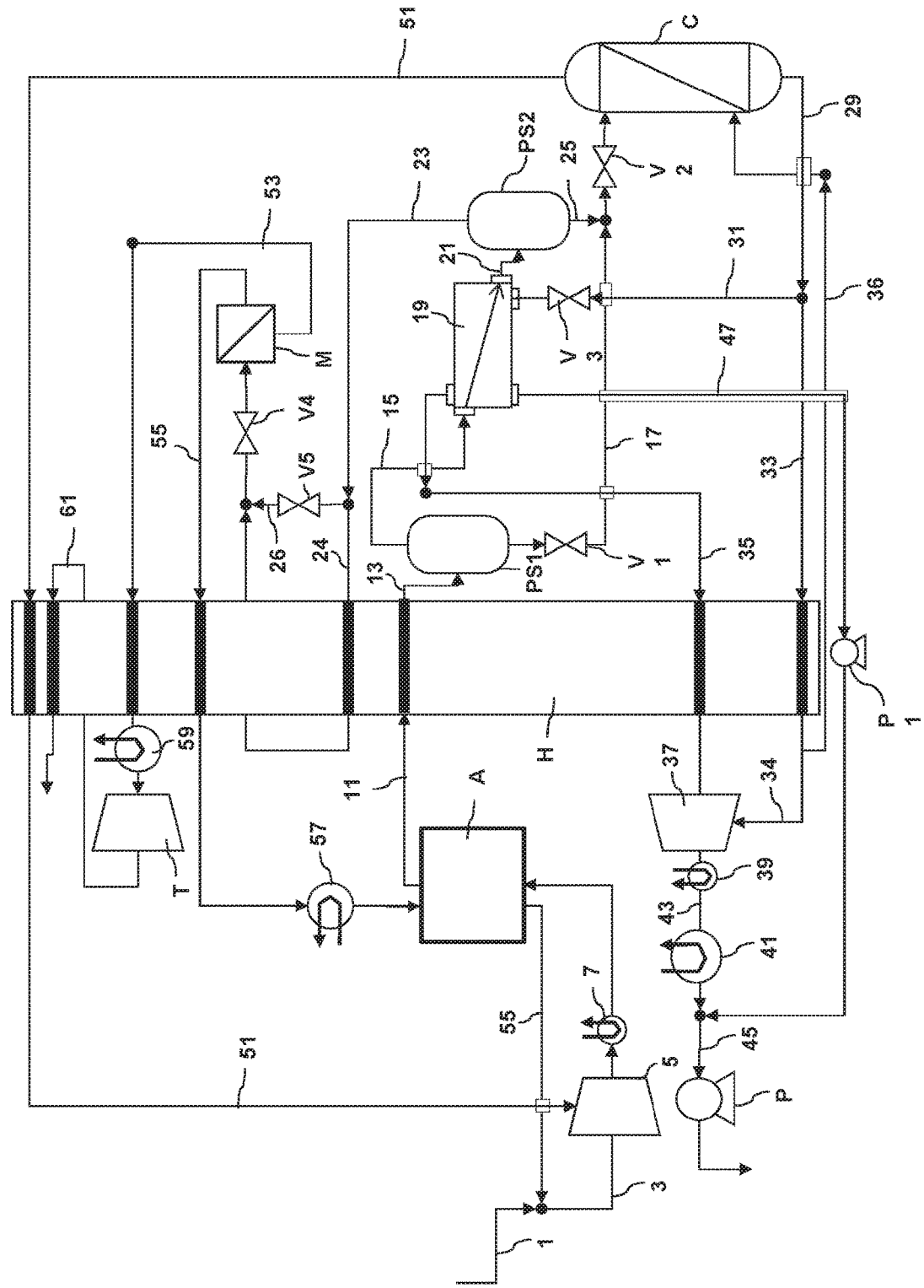
FIG. 2 provides a process flow diagram in accordance with an embodiment of the present invention.

One solution supplied is illustrated in FIG. 2 and consists of separating the gas to be sent to the membranes into two, a first portion 24 is heated completely in the main exchanger H up to the hot end and the second 26 is mixed with this heated gas. Owing to a control valve V5 on flow 26, regulation of cold flow makes it possible to control the temperature of the mixture and therefore the inlet temperature of the membrane system M.

Figure 3:
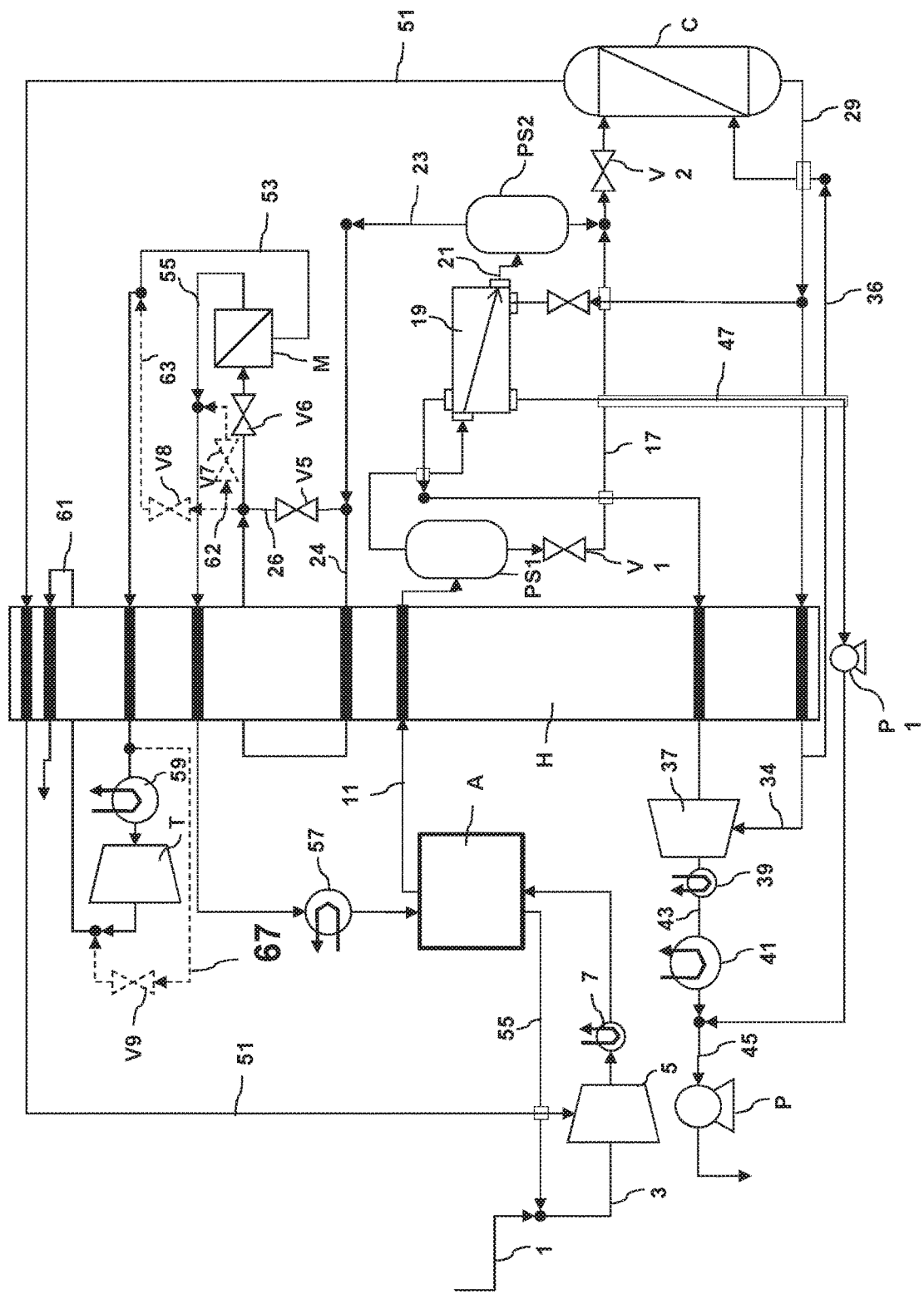
FIG. 3 provides a process flow diagram in accordance with a second embodiment of the present invention.

Regarding start-up of the membranes, the recommended starting procedure involves modifications of the apparatus, as illustrated in FIG. 3. Here, FIG. 2 has been modified by adding a pipe 62, shown in dotted lines, joining the point of mixing flows 24 and 26 with flow 55 of the permeate, through a valve V7. A pipe 63 connects this same mixing point to flow 53 of non-permeate, through valve V8.

In addition, a pipe 67 with a valve V9 makes it possible to by-pass the turbine T.

In order to start up the method, according to a first step:
gas valve V5 sending the cold gas 26 directly to the membranes M is closed, all the gas is heated in the exchanger H via pipe 24.
valve V6 at the inlet of the membranes M is closed as the membranes have not yet been started up.
gas 24 heated in the heat exchanger H is then separated into two portions 62,63:
a first portion 62 of the heated gas 24 circulates in a first bypass circuit (regulated by a first bypass valve V7) of the membranes M to the channel that is to receive the permeate 55 from the membranes M: in fact, as the permeate 55 may be used for regenerating the dryers A of the unit, a flow is necessary for providing this regeneration. Thus, flow 62 replaces the permeate 55. The opening of valve V7 is regulated to allow the nominal flow of permeate 55 from membrane M to pass. Valve V7 may be replaced by several valves in parallel to allow greater variation of flow.
a second portion 63 of the heated gas 24 circulates in a second bypass circuit (regulated by a valve V8) which sends the remainder 63 of the gas to atmosphere, optionally passing through exchanger H and/or through the turbine(s) T. In the latter case, as the flow is greater than the nominal flow of the turbine(s) T, a V9 bypass circuit, 67 of the turbine(s) is required if the latter have not been dimensioned for treating this additional flow. Similarly, the channel in question in exchanger H that leads to the turbine T will have to be dimensioned for treating this additional flow. Another option consists of only starting up the turbine(s) T after complete start-up of the membranes. The turbine or turbines are completely bypassed via valve V9 in this case.

According to a second step:
Valve V6 at the inlet of the membranes M will be opened gradually and valve V8 will gradually be closed, valve V5 remaining closed. Hot gas will then be sent to the membranes M. A gas will begin to pass through the membrane and form the permeate 55.
Valve V7 will have to be closed slightly to provide the same flow for regeneration of the dryers A of the unit
The flow 61 sent into the air will gradually decrease owing to permeation of the $CO_2$ and its partial condensation, it will be possible to close valve V9 for bypassing the turbine T.
This procedure will be continued until valve V6 at the inlet of the membranes M is fully open. As the membranes have lower performance when hot, the flow rate and the composition of the permeate 55 and of the residue 53 from the membranes will be different from their nominal values. The two valves V7,V8 are therefore still partially open.

It will be possible to gradually open valve V5 for cold gas 26 that has to be sent to the membranes, without being heated. The gas at the inlet of the membranes M will therefore cool down: the cold descent of the membranes is triggered. The valves V7, V8 will have to close gradually because the performance of the membranes M will improve.

The procedure stops when the temperature at the inlet of the membranes M is the nominal temperature allowing the membranes to be optimal and therefore close the two valves V7, V8.

It is particularly important to control the cold descent of the membranes M so that the mechanical stresses are not too large. A rate between 0.2 and 0.5° C. per minute is recommended in this case.

This system also makes it possible, in normal operation, to control the temperature of the membranes M in order to control their performance even after normal degradation due to their service life.

It will be understood that the methods of regulation described apply to different methods of separation involving a step of permeation at a temperature below −10° C.

In particular the presence of a separating column is not essential, nor the presence of two phase separators.

The product enriched in carbon dioxide may be a gaseous or liquid product or both and may or may not be under pressure.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for separating a mixture containing carbon dioxide, the method comprising the steps of:
   i) cooling and partially condensing the mixture in a heat exchanger and then separating a first liquid from the mixture in a first system operating at low temperature, the first system comprising at least one first phase separator; and
   ii) treating a gas from the first system in a membrane system to produce a permeate and a non-permeate, the gas from the first system being divided into two portions, a first portion being sent to the membrane system without being heated and a second portion being heated in the heat exchanger to at least an intermediate temperature of the heat exchanger and then sent to the membrane system without being cooled,
   wherein the mixture is purified by adsorption in an adsorption unit upstream of the heat exchanger, and during a first phase, which is a starting phase, at least one portion of the gas from the first system is sent to the adsorption unit as a regenerating gas and no portion of the gas from the first system is sent to the membrane system and during a subsequent phase, which is an operating phase following the starting phase, at least one portion of the gas from the first system is sent to the membrane system and at least one portion of the permeate or non-permeate from the membrane system is sent to the adsorption unit as a regenerating gas.

2. The method as claimed in claim 1, wherein during a second phase, which is a starting phase, following the first phase, a portion of the gas from the first system is heated and then sent to the membrane system and at least one portion of the permeate or non-permeate from the membrane system as well as a portion of the gas from the first system are sent to the adsorption unit as a regenerating gas.

3. A method for separating a mixture containing carbon dioxide, the method comprising the steps of:
   i) cooling and partially condensing the mixture in a heat exchanger and then separating a first liquid from the mixture in a first system operating at low temperature, the first system comprising at east one first phase separator; and
   ii) treating a gas from the first system in a membrane system to produce a permeate and a non-permeate, the gas from the first system being divided into two portions, a first portion being sent to the membrane system without being heated and a second portion being heated in the heat exchanger to at least an intermediate temperature of the heat exchanger and then sent to the membrane system without being cooled,
   wherein during a first phase, which is a starting phase, at least one portion of the gas from the first system is sent to atmosphere and no portion of the gas from the first system is sent to the membrane system and during a subsequent phase, which is a phase of stable operation, at least one portion of the gas from the first system is sent to the membrane system and at least one portion of the permeate or non-permeate from the membrane system is sent to atmosphere.

4. The method as claimed in claim 3, wherein in the first phase, at least one portion of the gas from the first system is expanded in a turbine and then sent to atmosphere and in the subsequent phase, at least one portion of the non-permeate is expanded in a turbine and then sent to atmosphere.

5. The method as claimed in claim 4, wherein in the first phase, a first portion of the gas from the first system is expanded in the turbine and then sent to atmosphere and a second portion of the gas from the first system is expanded in an expanding means other than the turbine and then sent to atmosphere.

6. The method as claimed in claim 1, wherein during a second phase, which is a starting phase, a portion of the gas from the first system is heated and then sent to the membrane system and another portion of the gas from the first system is sent to atmosphere, optionally after expansion in a turbine.

7. The method as claimed in claim 1, wherein the first system further comprises a separating column for the liquid received from the phase separator.

8. The method as claimed in claim 1, wherein the heat exchanger has a hot end, when the second portion is heated in the heat exchanger up to the hot end of the heat exchanger prior to being sent to the membrane system without being cooled.

9. An apparatus for separating a mixture containing carbon dioxide, comprising:
   i) a unit for drying by adsorption;
   ii) a heat exchanger;
   iii) a first separating system able to operate at a temperature below −10° C. comprising at least one first phase separator and optionally a separating column connected for receiving a liquid from the first phase separator;
   iv) a pipe for sending a mixture dried in the unit for drying by adsorption to be cooled in the heat exchanger to form a partially condensed flow;
   v) a pipe for sending the partially condensed flow from the heat exchanger to the first separating system;
   vi) a membrane system;
   vii) a pipe for bringing out a flow enriched in carbon dioxide from the first separating system in liquid form;
   viii) a pipe for sending a gas from the first system to the membrane system; and
   ix) a pipe for bringing out a permeate from the membrane system and a pipe for bringing out a non-permeate from the system;
   wherein the pipe for sending the gas from the first system to the membrane system is connected to the heat exchanger in order to allow a portion of the gas to be heated to at least an intermediate temperature of the heat exchanger, preferably up to the hot end of the latter, before being sent to the membrane system, the membrane system being connected to the first system by another pipe for sending another portion of the gas to the membrane system without being heated in the heat exchanger,
   wherein the apparatus further comprises means for sending at least one portion of the gas from the first system to a drying unit as a regenerating gas.

10. The apparatus as claimed in claim 9 further comprising a turbine and means for sending at least one portion of the gas from the first system to be expanded in the turbine.

11. The apparatus as claimed in claim 10 further comprising means for bypassing the turbine.

12. The apparatus as claimed in claim 9 further comprising a turbine and means for sending at least portion of the non-permeate to be expanded in the turbine.

13. The apparatus as claimed in claim 12 further comprising means for bypassing the turbine.

* * * * *